Jan. 26, 1932.   K. E. BEMIS   1,842,576
METHOD OF PREPARING BUNS FOR SANDWICHES
Original Filed Oct. 27, 1927

Inventor:
Ken E. Bemis
By Harry C. Alburts
Atty.

Patented Jan. 26, 1932

1,842,576

UNITED STATES PATENT OFFICE

KEN E. BEMIS, OF OAKLAND, CALIFORNIA, ASSIGNOR, BY MESNE ASSIGNMENTS, TO FOUNTAIN PRODUCTS CORPORATION, A CORPORATION OF ILLINOIS

METHOD OF PREPARING BUNS FOR SANDWICHES

Renewal of application Serial No. 229,282, filed October 27, 1927. This application filed February 24, 1931. Serial No. 517,773.

This invention relates to a method of preparing edible products and more particularly to pre-baked dough products for the reception of sandwich fillers, although certain features thereof may be employed with equal advantage for other purposes.

It contemplates more especially the novel processing of pre-baked dough products to serve as an envelope for any suitable sandwich filler, thereby enabling the consumption thereof without resort to a dish, fork or other commonly employed eating implement.

Sandwich luncheons are becoming increasingly popular but an objectionable feature is the required handling during the consumption thereof to the end that the filler too often is displaced from the sandwich for accidental lodgement on the individual's garment. Sandwich fillers usually attempt to confine various forms of garnishes and other juicy appetizers which are incapable of retention without undue care and attentive handling. This precludes the preparation and consumption of very tasty and appetizing edibles for sandwich consumption with known methods, and for that reason sandwiches have ordinarily been served with dry and rigid fillers which are not altogether desirable.

Moreover, standard sandwiches of uniform taste and preparation are impossible with the customary methods, and for that reason sandwich luncheons vary within a wide range without any possible pre-expectancy at the instance of the purchaser. Standardized sandwich luncheons have not heretofore been known nor thought possible of attainment; however, this is readily possible with the teachings of the present invention to the end that a uniform heated sandwich luncheon can be dispensed over the counter without quality, taste or other variations throughout an almost universal market irrespective of geographical limitations.

With the teachings of the instant invention, the objectionable features of the customary sandwich are entirely overcome, and improved edibles are capable of preparation with enhanced taste and facility to consume without resort to dishes, forks or other commonly employed eating implements. Moreover, most any type of filler may be employed with juicy or liquid taste imparting ingredients and appetizing garnish to the end that sandwiches may be served in a very tasty and improved manner without subjecting the individual to any possible embarrassment or inconvenience through the soiling of garments by the accidental lodgement of greasy or juicy fillers.

One object of the present invention is to provide a new and novel method of preparing pre-baked edibles for sandwich purposes.

Another object is to provide a process of preparing edible sandwiches in a manner which improves the taste and handling characteristics thereof.

Another object is to process edible sandwiches in a manner so as to afford the preparation of a product having uniform taste, size and quality characteristics with little variations to the end of definite standardization.

Still another object is to provide a method of providing a sandwich having a tasty filler envelope to enable consumption without resort to dishes, forks or other commonly employed eating implements.

A further object is the provision of a process of preparing pre-baked edibles to the end of providing a filler confining cavity therein for enhancing the taste qualities and consumption characteristics thereof.

A still further object is to provide an improved method of preparing sandwiches having a totally confining edible envelope with an interiorly toasted filler retaining cavity.

Still a further object is the provision of a method of preparing pre-baked dough edibles to serve as an envelope for sandwich fillers of any physical consistency or characteristics without subjecting an individual to garment soiling or requiring resort to dishes, forks or other commonly employed eating implements.

An additional object is to provide a process of preparing novel and improved sandwiches which can be commercially served over the counter and held in the fingers for convenient consumption without resort to auxiliary eating implements.

Other objects and advantages will appear from the following description of an illustrative embodiment of the present invention.

Figure 1:
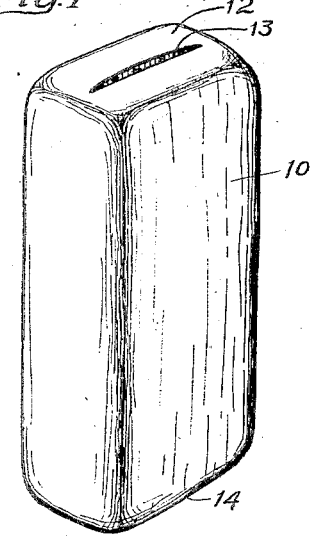
Figure 1 is a perspective view of a pre-baked dough product showing the slit therein for a cavity formation.
Figure 2:
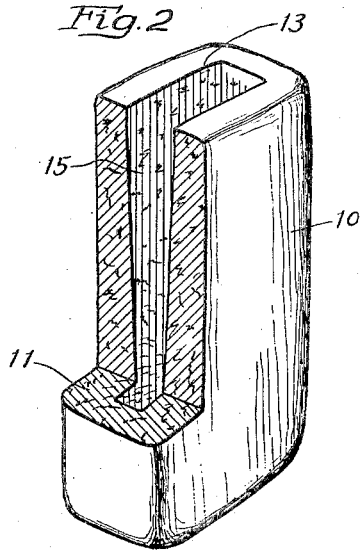
Figure 2 is a perspective view of the bun shown in Figure 1 subsequent to the formation of the cavity therein for the reception of an edible filler such as cheese, frankfurters or meats in the presence or absence of garnish such as lettuce and similar appetizers, parts thereof being broken away to clarify the showing.
Figure 3:
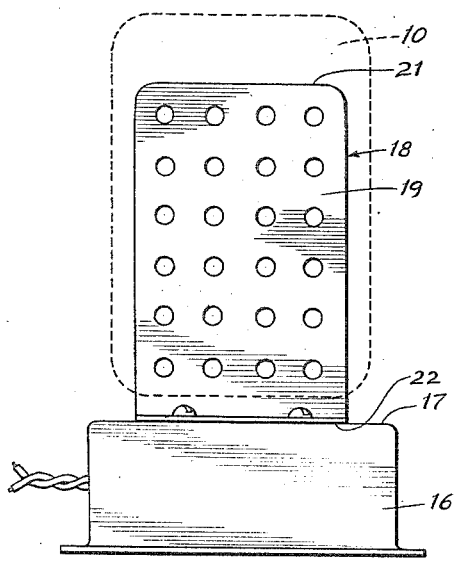
Figure 3 is a front view in elevation of a toasting device which serves to form the cavity for confining the edible sandwich fillers.
Figure 4:
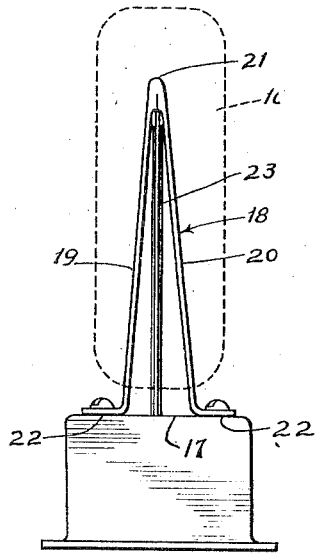
Figure 4 is an end view of the device shown in Figure 3, the pre-baked dough article being shown in association therewith in dotted outline.

A process of preparing edibles selected for illustrating the teachings of the present invention comprises the processing of edible substances such as pre-baked dough products so as to serve as an envelope for fully confining sandwich fillers of any desired physical consistency and characteristics conducive to a tasty and appetizing product for consumption purposes. No particular apparatus is essential, but to clarify the disclosure reference is had to the illustrated structure selected merely for illustration. The pre-baked dough product may be of any form or possess any desired edible characteristic, these being of standard variety or specially prepared for the purpose, as commercial practice may dictate.

The preferable form of the edible sandwich filler envelope comprises a pre-baked dough product such as a bun or roll having a crusted exterior 10 with a yieldable dough interior 11 shaped to present an elongated, preferably flat configuration. The bun is first severed along one end 12 thereof to present a linear slit 13 which continues through the interior along the length thereof to the region approaching the opposite end 14, care being taken not to pierce or rupture the crusted exterior 10 except in the original region of insertion in the end 12 thereof so as to form a pocket enclosed on all sides except for the mouth thereof constituting the region of initial severance or piercing. The flat sides of the pocket originating from the slit 13 are then separated as far as practical so as to create a form retaining enclosed cavity 15 for confining any suitable edible filler such as properly prepared meats, cheese, jelly, or any combinations thereof together or in the absence of a garnish such as lettuce, pickles and similar edibles commonly resorted to for improving the taste of sandwiches or imparting an appetizing flavor thereto. The walls of the enclosed pocket or cavity are subjected to elevated temperatures to rigidify the yielding character thereof, render such form retaining and improve the taste characteristics thereof.

In order to further improve the taste characteristics of the sandwich prepared in this manner, the interior walls of the cavity 15 are preferably heated for a period sufficient to effect the toasting thereof. This lends crispness to the cavity walls 15 and imparts the desired rigidity thereto for a more advantageous and successful incorporation of the sandwich filler, and further results in a more tasty edible to the end that it may be consumed without resort to any dishes, forks or other commonly employed eating implements. The juices of the filler, garnish or appetizer cannot possibly be displaced therefrom for accidental lodgement on the individual to the end of precluding soiled garments and other inconveniences usually attendant with the consumption of ordinary sandwiches.

The edible may be prepared and the process performed with a device comprising, in this instance, a suitable base 16 stamped or otherwise shaped from sheet material to present a supporting surface 17. The surface 17 supports a member 18 which comprises, in this instance, an elongated spike having flat inclined sides 19 and 20 which converge to define an angular edge 21 with the diverging ends flanged as at 22 for attached support on the base surface 17 in any suitable manner as commercial practice may dictate.

In consequence thereof, the bun 10 may be originally pierced with a knife or other severing implement to present an initial slit 13 which is placed over the edge 21 of the cavity forming member 18 for telescopic association responsive to the continued displacement through the interior of the bun 10 along the length thereof to the end of forming the cavity 15 by the displacement of the dough 11 outwardly into the body of the bun 10. The manual displacement of the bun 10 over the cavity forming member 18 continues to a point reaching the opposite end region 14 without piercing or rupturing the exterior of the bun 10 except in the initial region 13.

Simultaneous with the formation of the cavity 15 by the displacement of the bun 10 over the forming member 18, heat is supplied from any suitable source such as an electric heating element 23 of any approved or suitable construction. The heating element 23 is preferably confined between the sides 19 and 20 of the cavity forming member 18 so as to elevate the temperature of the bun interior. The heat is supplied and the bun 10 retained on the forming member 18 preferably for a period sufficient to toast the walls of the cavity 15, thereby imparting crispness, improved taste and form retaining rigidity thereto. The bun 10 is thereupon removed from the forming member 18, and any suitable filler incorporated in the cavity 15 for convenient and tasty consumption without mess or other objectionable features of the customary sandwiches.

It is worthy of note that any type of food filler or various combinations thereof together with a garnish such as lettuce and a gravy may be confined in the pocket or cavity 15, it being preferably placed therein as a unit with any suitable implement or assembling device. Moreover, the edible produce 10 may be of any type or variety, and preferably though not essentially consists of a highly flexible prebaked dough product which is readily processed in the manner herein described to serve far more advantageously as an envelope for a filler which is consumed therewith from the fingers.

Various changes may be made in the embodiment of the invention herein specifically described without departing from or sacrificing any of the advantages of the invention as defined in the appended claims.

I claim:

1. A new and improved process for preparing an edible envelope or casing which consists in taking a product formed from a baked mass of dough, inserting a preformed member in said product to deform the interior thereof into a form retaining cavity without rupturing the enveloping surface thereof except in the region of insertion conforming substantially to the cross-section of said member, subjecting the walls of said cavity to elevated temperatures for the purpose of producing a heated edible, and removing said preformed member so that said cavity may confine an edible filler.

2. A new and improved process for preparing an edible envelope or casing which consists in taking a product formed from a baked mass of dough, inserting a preformed heated metallic member in said product to deform the interior thereof into a form retaining cavity without rupturing the enveloping surface thereof except in the region of insertion conforming substantially to the cross-section of said metallic member, and removing said preformed member so that said cavity may confine an edible filler.

3. A new and improved process for preparing an edible envelope or casing which consists in taking a product formed from a baked mass of dough, inserting a preformed heated metallic member of elongated cross section in said product to deform the interior thereof into a form retaining cavity without rupturing the enveloping surface thereof except in the region of insertion conforming substantially to the cross-section of said metallic member, and removing said preformed member so that said cavity may confine an edible filler.

4. A new and improved process for preparing an edible envelope or casing which consists in taking a product formed from a baked mass of dough, inserting a preformed heated metallic member of elongated cross section and increasing body thickness in said product to deform the interior thereof into a form retaining cavity without rupturing the enveloping surface thereof except in the region of insertion conforming substantially to the cross-section of said metallic member, and removing said preformed member so that said cavity may confine an edible filler.

5. A new and improved process for preparing an edible envelope or casing which consists in taking a product formed from a baked mass of dough, inserting a preformed heated metallic member in said product through an edge thereof to deform the interior thereof into a form retaining cavity without rupturing the enveloping surface thereof except in the region of insertion conforming substantially to the cross-section of said metallic member, retaining said heated metallic member in said cavity for a period sufficient to impart a retaining shape thereto, and removing said preformed member so that said cavity may confine an edible filler.

6. A new and improved process for preparing an edible envelope or casing which consists in taking a product formed from a baked mass of dough, inserting a preformed heated metallic member in said product through an edge thereof to deform the interior thereof into a form retaining cavity without rupturing the enveloping surface thereof except in the region of insertion conforming substantially to the cross-section of said metallic member, retaining said heated metallic member in said cavity for a period sufficient to toast the walls thereof, and removing said preformed member so that said cavity may confine an edible filler.

7. The herein described method of preparing a baked product for sandwiches which consists in piercing the product from one edge to near the opposite edge for forming a deep pocket closed at all the lateral sides and bottom thereof, and then toasting the walls defining the pocket for a period sufficient to produce a substantially rigid walled toasted pocket within said baked product.

8. The herein described method of making a pocket in a baked product consisting in piercing the product at one edge, then gradually spreading the pierced portions without rupturing the exterior of said product except in the initial piercing region, and toasting the pierced portions substantially simultaneous with the spreading thereof to form a permanent substantially rigid walled pocket.

9. A new and improved process for preparing an edible envelope or casing consisting in taking a product formed by baking a mass of dough, piercing the said mass and displacing the material of said product outwardly into the body of the product and thereby forming a cavity within said product, and applying heat to the wall of said cavity.

10. A new and improved process for preparing an edible envelope or casing consisting in taking a product formed by baking a mass of dough, then inserting in said product a heated element and thereby forming a cavity and toasting the wall of said cavity.

In witness whereof, I subscribe my name.

KEN E. BEMIS.